United States Patent
Morello et al.

(10) Patent No.: US 9,883,256 B2
(45) Date of Patent: Jan. 30, 2018

(54) METHOD AND SYSTEM FOR TRANSMITTING SATELLITE SIGNALS AND RECEIVER THEREOF

(71) Applicant: RAI RADIOTELEVISIONE ITALIANA S.P.A., Rome (IT)

(72) Inventors: Alberto Morello, Turin (IT); Vittoria Mignone, Piobesi Torinese (IT); Bruno Sacco, Turin (IT)

(73) Assignee: RAI Radiotelevisione Italiana S.P.A., Rome (RM) (IT)

( * ) Notice: Subject to any disclaimer, the term of this patent is extended or adjusted under 35 U.S.C. 154(b) by 0 days.

(21) Appl. No.: 14/912,548

(22) PCT Filed: Sep. 2, 2014

(86) PCT No.: PCT/IB2014/064195
§ 371 (c)(1),
(2) Date: Feb. 17, 2016

(87) PCT Pub. No.: WO2015/033265
PCT Pub. Date: Mar. 12, 2015

(65) Prior Publication Data
US 2016/0212505 A1    Jul. 21, 2016

(30) Foreign Application Priority Data
Sep. 9, 2013   (IT) .............................. TO2013A0729

(51) Int. Cl.
*H04N 7/20* (2006.01)
*H04N 21/8547* (2011.01)
(Continued)

(52) U.S. Cl.
CPC ..... *H04N 21/8547* (2013.01); *H04B 7/18523* (2013.01); *H04L 1/0003* (2013.01);
(Continued)

(58) Field of Classification Search
CPC ........... H04N 21/8547; H04N 21/2365; H04N 21/61; H04N 21/23655; H04N 21/6143;
(Continued)

(56) References Cited

U.S. PATENT DOCUMENTS 7,908,528 B1 *   3/2011   Turudic ................. H03K 5/131
                                                               714/700
2007/0091857 A1   4/2007   Elstermann
(Continued)

FOREIGN PATENT DOCUMENTS

KR    10-2011-0050358      5/2011
RU    2009 137 6944 A      3/2008
WO    2008/111921 A1       9/2008

OTHER PUBLICATIONS

International Search Report dated Nov. 20, 2014, issued in PCT Application No. PCT/IB2014/064195, filed Sep. 2, 2014.
(Continued)

*Primary Examiner* — Brian T Pendleton
*Assistant Examiner* — Alan Luong
(74) *Attorney, Agent, or Firm* — Workman Nydegger

(57) ABSTRACT

A transmission system, a receiver and a method for satellite signal transmission, wherein the satellite signals includes respective data streams consisting of a sequence of data packets. The method includes: subdividing the data packets of the data stream, through a splitter, into a first and at least one second data pseudo-streams; modulating the first and at least one second data pseudo-streams through a first and at least one second modulators, respectively; transmitting the modulated data pseudo-streams through respective transmission channels (Ch#1 . . . Ch#N), wherein, in order to generate the data pseudo-streams, the splitter will: select each data packet of the data stream; interrogate the modulators in a sequential manner in order to identify that modulator which, among the modulators, is available to
(Continued)

accept the data packet, and send the latter to it; send a null data packet to the remaining modulators.

20 Claims, 2 Drawing Sheets

(51) Int. Cl.
| | |
|---|---|
| H04L 1/00 | (2006.01) |
| H04L 5/00 | (2006.01) |
| H04N 21/61 | (2011.01) |
| H04N 21/2365 | (2011.01) |
| H04B 7/185 | (2006.01) |
| H04L 29/06 | (2006.01) |

(52) U.S. Cl.
CPC .......... *H04L 5/0042* (2013.01); *H04L 5/0044* (2013.01); *H04L 65/4069* (2013.01); *H04N 21/23655* (2013.01); *H04N 21/6143* (2013.01)

(58) Field of Classification Search
CPC ..... H04B 7/185; H04B 7/18523; H04L 29/06; H04L 1/0003; H04L 5/0042; H04L 5/0044; H04L 65/4069
USPC ............. 380/255; 375/259; 725/63; 370/312
See application file for complete search history.

(56) References Cited

U.S. PATENT DOCUMENTS

| | | | |
|---|---|---|---|
| 2008/0253564 A1* | 10/2008 | Kahn .................... | H04N 7/20 380/200 |
| 2010/0103950 A1 | 4/2010 | Statelov et al. | |
| 2010/0199159 A1* | 8/2010 | Isnardi ................ | H03M 13/096 714/807 |
| 2011/0164706 A1* | 7/2011 | Yokokawa .......... | H04L 27/2602 375/340 |
| 2012/0224691 A1* | 9/2012 | Purohit .................... | H04L 1/04 380/255 |
| 2016/0241320 A1* | 8/2016 | Roberts ................ | H04B 7/0417 |

OTHER PUBLICATIONS

International Preliminary Report on Patentability dated Mar. 15, 2016, issued in PCT Application PCT/IB2014/064195, filed Sep. 2, 2014.
Russian Search Report dated Oct. 11, 2017, issued in Russian Application No. 2016113369/07, filed Sep. 9, 2014.
Russian Office Action dated Oct. 27, 2017, issued in Russian Application No. 2016113369/07, filed Sep. 9, 2014.

* cited by examiner

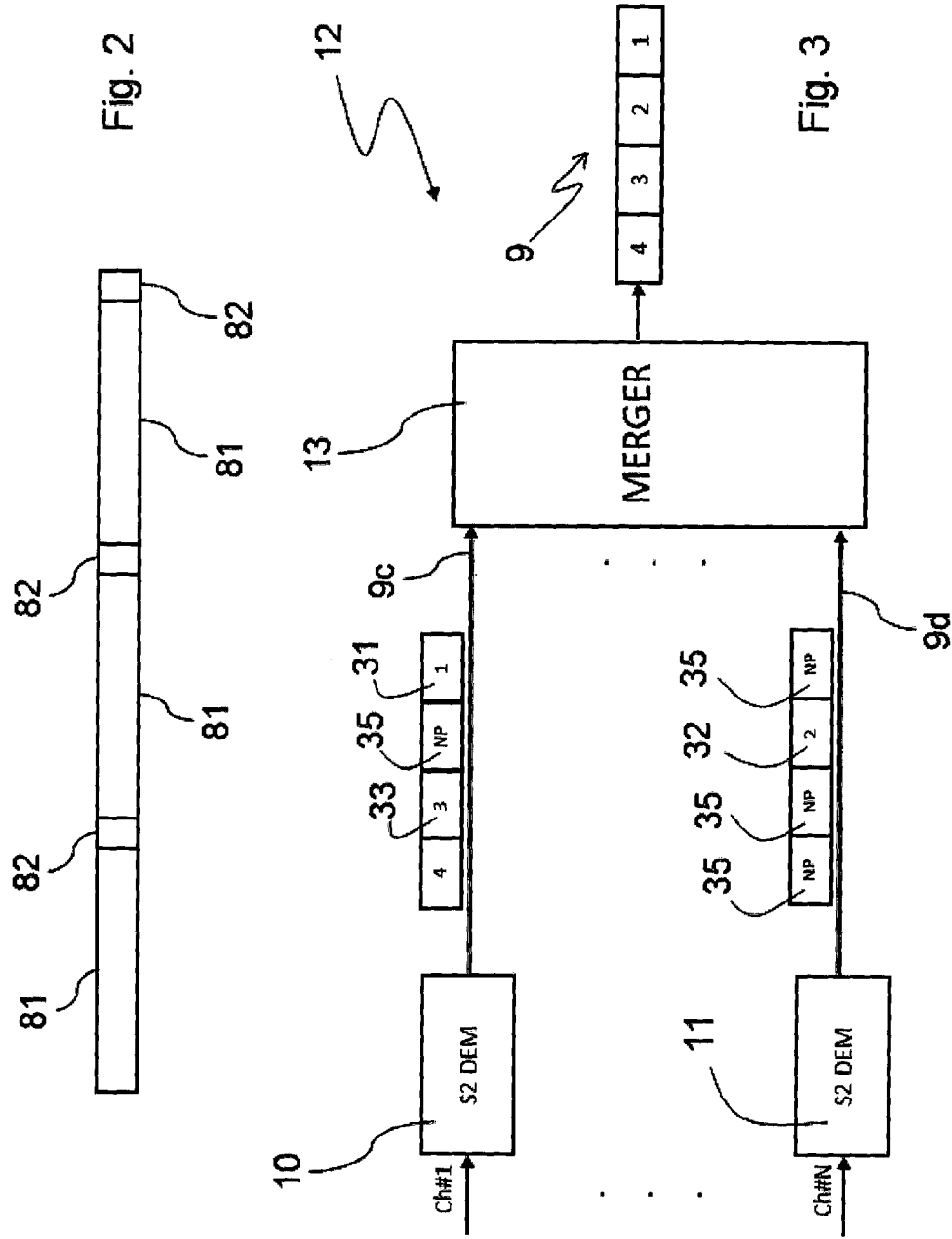

METHOD AND SYSTEM FOR TRANSMITTING SATELLITE SIGNALS AND RECEIVER THEREOF

BACKGROUND OF THE INVENTION

Field of the Invention

The present invention relates to a transmission method and system for satellite signal transmission, as well as to a related receiver.

Present State of the Art

As is known, DVB-S2 is the second-generation standard for satellite transmissions that was defined by DVB in 2003. This standard was designed for various broadband satellite transmission applications, such as Standard Definition TeleVision (SDTV) and High Definition TeleVision (HDTV) broadcasting, interactive applications for home and professional users (e.g. Internet access), professional television contribution and SNG (Satellite News Gathering) services, distribution of TV signals to VHF/UHF digital-terrestrial transmitters, data and Internet site distribution (Internet trunking), and more.

A transmission system based on the DVB-S2 standard can accept any input data stream format (so long as it is digital), such as, for example, digital streams of the MPEG Transport Stream (MPEG-TS) type.

MPEG-TS digital streams may be either of the single or multiple type, i.e. they may, for example, transport one or more television/radio programs, interactive contents, or the like. To each MPEG-TS stream specific modulation parameters can be assigned, e.g. by using the Variable Coding & Modulation (VCM) technique, or, in point-to-point applications, the Adaptive Coding & Modulation (ACM) technique. For each new elementary data block, the latter allows changing the modulation scheme and consequently the error protection levels, thus optimizing the transmission system according to the user's reception conditions; such conditions may, in fact, change depending on weather conditions.

When the modulator is using the ACM technique, transmission delays may vary depending on the adaptive modulation/coding scheme. In order to solve this problem, the DVB-S2 standard provides for using a subsystem for synchronizing the input data stream (optional and not applicable to single MPEG-TS streams), which, through the transmission of a timing parameter from the modulator, ensures constant transmission bit rate and delay at a receiver of packet transmissions (as required, for example, for MPEG-TS streams).

According to the DVB-S2 standard, when the value of the ISSYI bit of the MATYPE field in the baseband header BBHEADER is 1, a 22-bit counter is activated in the modulator, which counts at a frequency equal to the symbol rate Rs of the modulator. The modulator appends an ISSY (Input Stream Synchronizer) field to the end of each packet, which is 2 or 3 bytes long and comprises an ISCR (Input Stream Clock Reference) subfield containing the counter value at the instant when the packet enters the modulator. The ISCR subfield may be either long (22 bits) or short (15 bits); in this latter case, the subfield ISCR will contain the 15 least significant bits of the counter.

The satellites currently in use operate on bands having a typical width of 33-36 MHz, which, in broadcasting applications, allow for transmission of data over a satellite transponder at a bit rate of the order of, for example, 60 Mbit/s.

The introduction of Ultra High Definition TeleVision (UHDTV) services, also referred to as 4K or 8K television, has required a transmission bit rate in the range of 17-20 Mbit/s for each television service to be transmitted. This makes it necessary to improve the utilization of the transmission/reception capacity provided by current satellites, minimizing the unused transmission/reception capacity of every single transponder.

At present, the DVB-S2 technology allows transmitting on a 33-36 MHz satellite channel an MPEG-TS stream containing three UHDTV programs by using "statistical multiplexing". An MPEG-TS stream containing multiple programs is also known as "multiplex".

Statistical multiplexing of video programs is a technique that allows splitting the available bit rate among the various programs to be transmitted, according to the instantaneous video coding requirements of each one of them. By using variable bit rate (VBR) coding, and taking into account that the bit rate required for obtaining a given quality from a video program is not constant over time but changes according to the type of image to be coded, and that, statistically, request peaks are not simultaneous for the programs contained in the multiplex, statistical multiplexing allows increasing the number of broadcast programs, the total bit rate of the MPEG-TS stream being equal. In fact, the gain offered by statistical multiplexing, expressed as the number of programs (or services) that can be included in the multiplex, increases with the ratio between the global bit rate of the MPEG-TS stream and the average bit rate required by a single program. This is because the lower the global bit rate of the MPEG-TS stream, the larger the unused capacity within the satellite multiplex.

With reference to the above example, if a 120 Mbit/s MPEG-TS stream were generated, it could be reasonably estimated that 7 or 8 UHDTV programs could be transmitted within the same multiplex by using statistical multiplexing, i.e. up to two more than could be transmitted with two 60 Mbit/s MPEG-TS streams.

The prior art does not allow, however, splitting an MPEG-TS stream in transmission into several distinct streams to be transmitted on different satellite channels, and then reconstructing said MPEG-TS stream on the receiver side.

SUMMARY OF THE INVENTION

It is therefore one object of the present invention to provide a method and a system for satellite signal transmission which is adapted to subdivide a high bit-rate MPEG-TS stream into multiple streams to be transmitted via satellite on a plurality of frequency channels.

It is a further object of the present invention to provide a method and a system for satellite signal transmission that minimizes the unused transmission/reception capacity within a satellite communication channel.

In brief, the present invention aims at providing a transmission system, a receiver, and a method for ultra-high bit-rate satellite signal transmission by bonding together multiple satellite channels. The technique for bonding together multiple channels, even without consecutive frequencies, is commonly referred to as "Channel Bonding". The present invention aims, in particular, at providing a method for splitting an MPEG-TS transmission stream into a plurality of pseudo-streams to be simultaneously transmitted on a plurality of channels bonded together.

The invention provides a method for splitting an MPEG-TS stream on the transmitter side into N streams, or pseudo-streams, to be transmitted on as many satellite transmission channels, and then reconstructing the original MPEG-TS stream in the receiver after the N signals received have been properly demodulated. The invention is also applicable to the case wherein the signals transmitted by the N modulators have different transmission parameters, i.e. a different symbol rate Rs and different modulation and coding parameters.

Further advantageous features of the present invention will be set out in the appended claims.

BRIEF DESCRIPTION OF THE DRAWINGS

Such features as well as further advantages of the present invention will become more apparent from the following description of an embodiment thereof as shown in the annexed drawings, which are supplied by way of non-limiting example, wherein:

FIG. 2 illustrates one of the internal packet streams of a generic modulator;

FIG. 3 illustrates a satellite signal decoder according to the invention.

DETAILED DESCRIPTION OF THE PREFERRED EMBODIMENTS

Figure 1:
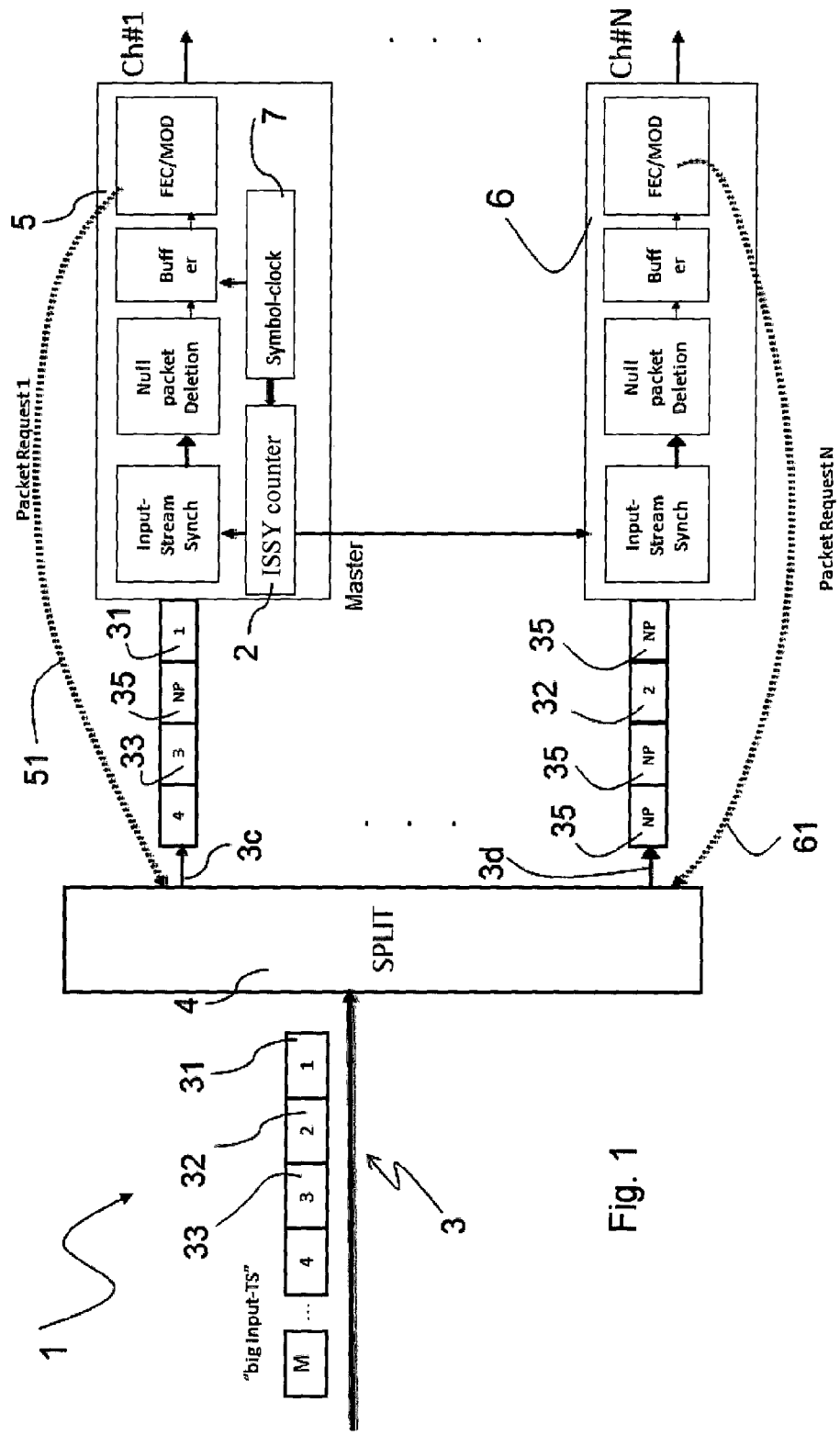
FIG. 1 is a block diagram of a satellite signal transmission system according to the invention.

With reference to FIG. 1, a satellite signal transmission system 1 according to the invention comprises at least one first modulator 5, preferably compatible with the DVB-S2 standard, and one second modulator 6, which respectively transmit a first data stream, or first pseudo-stream, on a first transmission channel Ch#1 and a second data stream, or second pseudo-stream, on a second transmission channel Ch#N. The channels Ch#1 . . . Ch#N are distinct from each other, and are preferably of the satellite type. These channels, in fact, occupy distinct (non-overlapped) frequencies and/or different polarizations. Also, the signals transmitted on these transmission channels Ch#1 . . . Ch#N may have different characteristics, i.e. a different bandwidth B and/or a different symbol rate Rs and/or different modulation and coding parameters.

The man skilled in the art will be able to use more than two modulators (and hence more than two transmission channels and respective demodulators on the receiver side), without however departing from the teachings of the present invention.

The transmission system 1 also comprises the following elements:
  splitting means 4, also referred to as SPLIT;
  a reference clock 7, also referred to as clock, reference clock or symbol clock, which represents the symbol clock of a modulator 5,6 of the transmission system 1, e.g. the modulator 5, which thus becomes the master modulator with which a master transmission channel is associated;
  a counter block ISSY 2, which is in signal communication with the modulators 5,6.

The Rate Adapter is a subsystem generally included in a typical digital modulator for adapting the bit rate Ri of an MPEG-TS stream 3 inputted to said subsystem in order that the output stream will have a bit rate suitable for use at the input of a modulator 5,6, wherein said bit-rate adaptation is carried out by inserting some null packets. In the case of an MPEG2-TS stream, the Rate Adapter recalculates and updates all the time stamps included in the audio/video services.

In the application according to the present invention, should an adaptation of the bit rate of the MPEG-TS stream 3 be necessary, this will have to be done upstream of the splitting means 4.

Note also that the transmission rate adaptation function may be disabled in the modulators 5,6 (if the modulators 5,6 have such functionality), i.e. disabling the Rate Adapter subsystem, which would otherwise perform the above-described adaptation on the respective pseudo-stream.

Furthermore, also the function for controlling the continuity of the input MPEG-TS packets (based on the value of the "Continuity Counter" field), which is normally present in the modulators 5,6, is preferably disabled.

With reference to FIG. 1, the splitting means 4 split the input MPEG-TS stream 3, consisting of a sequence of data packets, into N pseudo-streams 3c,3d, controlled by the modulators 5,6 through control signals 51, 61 coming from the same modulators 5,6. When an i-th packet enters a j-th modulator, the j-th modulator will remain waiting for a new packet. The splitting means 4 subdivide the packets for the various modulators 5,6 in a sequential manner between the waiting modulators 5,6; if a modulator is not waiting, it will be ignored.

In FIG. 1, for example, the first packet of the MPEG-TS stream 3 is diverted by the splitting means 4 towards the first modulator 5, which is waiting. The second packet 32 is diverted by the splitting means 4 towards the modulator 6. The third packet 33 is diverted by the splitting means 4 towards the modulator 5, and so on according to the requests in the control signals 51,61.

This is possible by inserting a null packet (NP) into the pseudo-stream 3c in concomitance with each packet coming from the stream 3 and being sent to the pseudo-stream 3d. Likewise, a null packet is inserted into the pseudo-stream 3d in concomitance with each packet coming from the stream 3 and being sent to the pseudo-stream 3c. More in general, if the splitting means 4 are to generate N output pseudo-streams, for each packet selected from the stream 3 and sent to the generic pseudo-stream 3c, 3d, N−1 null packets will be sent to the respective other N−1 pseudo-streams. DVB-S2 includes the possibility, in the Multiple Transport Stream and Single/Multiple Generic Stream modes, of removing the null packets in transmission for better transmission efficiency, and then of properly reinserting them in reception. Moreover, the DVB-S2 standard offers the possibility of adding DUMMY frames for dealing with the absence of data to be transmitted. In the present invention, differently from the DVB-S2 standard, which does not include the possibility of removing null packets in the Single Transport Stream mode, the modulators 5,6 will activate a DVB-S2 Null Packet Deletion mode, and correspondent demodulators 10,11 (which will be described in detail below) will activate a DVB-S2 Null Packet Reinsertion mode for reinserting the null packets into their original positions. When these modes are active, the Dummy Frame Insertion mode must also be turned on in the modulators 5,6.

Differently from what is specified by the DVB-S2 standard, which does not provide for using the Input Stream Synchroniser (ISSY) in single MPEG-TS mode, according to the present invention the ISSY functionality is activated in the modulators 5,6 by setting to 1 the ISSYI parameter in the MATYPE-1 byte of the baseband header. As already shown, when ISSYI is 1 the DVB-S2 standard requires that a 22-bit counter be activated in each modulator, which operates at a frequency equal to the symbol rate Rs of the modulator.

According to the above description, and also with reference to FIG. 2, within a generic DVB-S2 modulator each MPEG-TS stream 3 is comprised of a sequence of packets 81, to each of which a final field 82 is appended. In the latter, either the whole current value of the counter (in ISSY long mode) or the 15 least significant bits of said current value (in ISSY short mode) are entered. According to the DVB-S2 standard, the content of the ISCR subfield is used by the receiver to reconstruct the clock of the MPEG-TS stream at the modulator, so as to ensure a constant bit rate and a constant delay for every single stream.

In the case of the invention, there is a unique counter block ISSY 2 driven at the cadence of the symbol rate Rs of the master modulator 5. The field 82 contains the value of the counter block ISSY 2, which is read as the packet enters the modulator 5,6; this will be used by the demodulators 10,11 in order to reconstruct the transmission timing of the packets of the MPEG-TS stream 3.

The system 1 according to the invention implements a method for satellite transmission of digital signals that comprises the following steps:
subdividing the data packets of the data stream 3, through the splitting means 4, into the first 3c and the least one second 3d data pseudo streams;
modulating the first 3c and the at least one second 3d data pseudo-streams through a first 5 and at least one second 6 modulators, respectively;
transmitting the modulated data pseudo-streams through respective transmission channels Ch#1 . . . Ch#N, wherein, in order to generate the data pseudo-streams 3c,3d, the splitting means 4 will:
select each data packet 31,32,33 of the data stream 3;
interrogate the modulators 5,6 in a sequential manner in order to identify that modulator, e.g. the first modulator 5, among said modulators 5,6, which is available to accept the data packet 31,32,33;
send a null data packet 35 to the remaining modulators, e.g. to the at least one second modulator 6.

Also with reference to FIG. 3, a receiver according to the invention comprises at least the following elements:
a first demodulator 10;
one or more second demodulators 11, preferably similar or equal to the first demodulator 10;
merging means 13, also referred to as mergers, arranged downstream of the first demodulator 10 and of the second demodulators 11, and in signal communication therewith.

The merging means 13 perform a function which is inverse to that of the splitting means 4. In operating conditions, the merging means 13 receive at their input all the pseudo-streams 9c,9d, re-align them on the basis of the ISCR subfield transmitted in the ISSY, and carry out a process inverse to that carried out by the splitting means 4, choosing packet by packet, among the pseudo-streams 9c,9d, the one containing a non-null packet, which will be used for reconstructing the original MPEG-TS stream 9.

If at a certain time instant all packets in the pseudo-streams 9c, 9d are null, then the merging means 13 will insert a null packet into the stream 9.

In a preferred embodiment, the merging means 13 of the receiver 12 comprise a memory block for each one of the N inputs, such that they can accommodate the differential delay to be compensated for on the N satellite transmission channels.

A man skilled in the art may also use a different configuration of the memory blocks without however departing from the teachings of the present invention.

The transmission channels Ch#1, . . . , Ch#N must not necessarily occupy adjacent frequency positions, nor be transmitted on the same satellite or on satellites occupying the same orbital position.

In general, a geostationary satellite shows a small movement relative to the Earth over the 24 hours, which is due to its non-perfect orbital position. In fact, the distance between the Earth and the satellite, and hence the delay in the propagation of the signal on the radio route, varies with daily periodicity. When two satellites are used which are subject to different daily variations, it may happen that the alignment of the two signals at the outputs of the demodulators 10,11 undergoes such variations as to alter the original order of arrival of the packets. For the original MPEG-TS to be reconstructed, it is however necessary that the delays between the N streams are compatible with the maximum allowable delays from the memory block of the merging means 13.

Of course, the example described so far may be subject to many variations.

According to one variant of the invention, the MPEG-TS stream 3 is subdivided into the N pseudo-streams 3c,3d by the splitting means 4 in a deterministic manner, i.e. not controlled by the modulators 5,6. $\eta_i$ being the spectral efficiency of the i-th modulator and mcd being the lowest common denominator of the spectral efficiencies $\eta_i, \ldots, \eta_N$, the splitting means 4 will pack the N pseudo-streams according to a time periodicity equal to $(\eta_{1+} \ldots +\eta_N) \times$ mcd packets of the MPEG-TS stream 3. Given a period of the MPEG-TS stream 3, the N pseudo-streams will have the same period, within which the i-th pseudo-stream will contain $\eta_i \times$ mcd MPEG-TS packets extracted from the MPEG-TS stream 3 and the remaining packets will be null. The time positions of the packets of the MPEG-TS stream 3 must be kept unchanged in the pseudo-streams 3c,3d.

In one variant of the merging means 13, the re-sorting of the received MPEG-TS packets is carried out on the basis of the value of a field, preferably the Continuity Counter field, comprised in the header of the packet 81 of each service contained in the MPEG-TS stream 3.

According to a second variant, the re-sorting of the received MPEG-TS packets is carried out on the basis of the content of a second field, preferably the PCR (Program Clock Reference) field of the header of the packet 81, of the MPEG-TS audio/video packets of each service contained in the MPEG-TS stream.

According to a third variant, the re-sorting of the received MPEG-TS packets is carried out on the basis of any combination of the preceding methods.

The MPEG-TS stream 3 contains packets containing the so-called Service Information (SI) tables, which transport information about the programs being transmitted and the transmission parameters. The Service Information (SI) tables may also be transmitted on all pseudo-streams 3c,3d, and may contain information necessary for knowing the frequency positions of the channels bonded together for transmitting the MPEG-TS stream, and which one of them is the master channel. In such a case, when the packet of the MPEG-TS stream 3 contains SI information (as indicated by the PID field in the header of the MPEG-TS packet), the packet will be simultaneously sent to all of the pseudo-streams, in derogation of the above-described mechanism (no stream will contain a null packet). The merging means 13 of the receiver 12, as they receive non-null packets on all branches with a PID indicating SI information, will select any one of the N packets (which are generally identical) while also taking into account the transmission error indicator (TEI) field of the header of the MPEG packet.

It is also possible to define a priori which channel in the group of channels bonded together for transmitting an MPEG-TS stream is the master channel.

The above-described technique may also be used for more than one MPEG-TS stream in DVB-S2 Multiple Transport Stream mode, thereby minimizing the unused band, e.g. when two independent MPEG-TS multiplexes are transmitted by using three satellite transponders.

The system, receiver and method for satellite signal transmission described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a system, a receiver and a method for satellite signal transmission, but may be subject to many modifications, improvements or replacements of equivalent parts and elements without departing from the novelty spirit of the inventive idea, as clearly specified in the following claims.

The invention claimed is:

1. A method for transmitting a satellite signal comprising a data stream that includes a sequence of data packets, said method comprising:
    subdividing said data packets of said data stream, through means for splitting, into a first and at least one second data pseudo-streams;
    modulating said first and said at least one second data pseudo-streams through a first and at least one second modulators, respectively;
    transmitting said modulated data pseudo-streams through respective transmission channels,
    wherein, in order to generate said data pseudo-streams, said means for splitting will:
    select each data packet of said data stream;
    interrogate said modulators in a sequential manner in order to identify that modulator which, among said modulators, is available to accept said data packet, and send the latter to it;
    send a null data packet to the remaining modulators.

2. The method according to claim 1, wherein said transmission system uses a reference clock associated with a master modulator included in said modulators, said reference clock operating a counter block, which is in signal communication with said modulators and is driven at a cadence of a symbol rate of said master modulator, and wherein a value of said counter block is added to each data packet as said data packet enters the modulator.

3. The method according to claim 2, wherein said stream is a single-type MPEG-TS stream, wherein an "Input Stream Synchronizer" functionality is activated in said modulators.

4. The method according to claim 3, wherein said stream is a single-type MPEG-TS stream, wherein a Null Packet Deletion mode and/or the Dummy Frame Insertion mode are activated in said modulators.

5. The method according to claim 1, wherein a transmission rate adapter system is disabled in said modulators.

6. The method according to claim 1, wherein a packet continuity counter function is disabled in said modulators.

7. The method according to claim 1, wherein said means for splitting are controlled through respective control signals coming from said modulators.

8. The method according to claim 1, wherein said means for splitting are controlled in a deterministic manner so that, being the spectral efficiency of the i-th modulator and mcd being the lowest common denominator of the spectral efficiencies $\eta_1, \ldots, \eta_N$, said means for splitting will pack said first and said at least one second pseudo-streams according to a time periodicity equal to $(\eta_{1+} \ldots +\eta_N)\times$mcd packets of said data stream, so that, given a period of said data stream, said pseudo-streams will have the same period, within which the i-th pseudo-stream will contain $\eta_i \times$mcd data packets extracted from the data stream and the remaining packets will be null, and wherein the time positions of the packets of the data stream will be kept unchanged in the pseudo-streams.

9. The method according to claim 1, wherein Service Information tables are transmitted on said pseudo-streams, said tables containing information necessary for knowing the frequency positions of the channels bonded together for transmitting said data stream and for identifying a master channel.

10. The method according to claim 9, wherein, when a packet of said data stream contains a piece of information of the Service Information table, the presence of said piece of information being indicated by the PID field in the header of said packet, said packet will be simultaneously sent to all of said pseudo-streams in derogation of the above-described mechanism, so that no pseudo-stream will contain a null packet.

11. A transmitter comprising:
    a splitter configured to receive a data stream; and
    wherein the splitter is configured to subdivide data packets of said data stream into a first and at least one second data pseudo-streams;
    a first and at least one second modulator configured to modulate, respectively, said first and said at least one second data pseudo-streams;
    a transmitter configured to transmit said modulated data pseudo-streams through respective transmission channels,
    wherein, in order to generate said data pseudo-streams, said splitter is configured to:
    select each data packet of said data stream;
    interrogate said modulators in a sequential manner in order to identify that modulator which, among said modulators, is available to accept said data packet, and send the latter to it;
    send a null data packet to the remaining modulators.

12. A method for receiving a satellite signal comprising a data stream that includes a sequence of data packets, said method comprising the steps of:
    receiving modulated data pseudo-streams through respective transmission channels;
    demodulating said first and said at least one second data pseudo-streams through a first and at least one second demodulators, respectively;
    merging said first and said at least one second data pseudo-streams, through means for merging, in order to reconstruct a data stream comprising packet sequences, wherein, in order to reconstruct said packet stream, said means for merging will:
    re-align said packet pseudo-streams on the basis of the value of a field of said data packet;
    select, for each data packet of said re-aligned pseudo-streams, the one that contains a non-null packet;

insert said non-null packet into the reconstructed data stream.

13. The method according to claim 12, wherein a Null Packet Reinsertion mode is activated in said demodulators.

14. The method according to claim 12, wherein said pseudo-streams are re-aligned on the basis of an ISCR ("Input Stream Clock Reference") subfield transmitted in an ISSY ("Input Stream Synchronizer") field.

15. The method according to claim 12, wherein said data pseudo-streams are re-aligned on the basis of a "Continuity Counter" field included in the header of each data packet of each service contained in the data stream, said data stream being an MPEG-TS stream, and/or on the basis of a "Program Clock Reference" field included in the header of each data packet of each service contained in said MPEG-TS stream.

16. The method according to claim 13, wherein said means for merging, when receiving non-null packets from all of said pseudo-streams with a PID indicating a piece of information in the Service Information table, will select any one of said packets by also taking into account the transmission error indicator field in the header of said packet.

17. The method according to claim 12, wherein, if at a certain time instant all the packets of said pseudo-streams are null packets, then said means for merging will insert a null packet into the reconstructed data stream.

18. The method according to claim 12, wherein said means for merging comprise a memory block for each input of said means for merging, so that they can accommodate the differential delay to be compensated for on said transmission channels.

19. A receiver for receiving a satellite signal that includes a data stream including a sequence of data packets, the receiver comprising:
a receiver configured to receive modulated data pseudo-streams through respective transmission channels, wherein the modulated data pseudo-streams include a first and at least one second data pseudo-stream;
a first and at least one second demodulator configured to demodulate, respectively, said first and said at least one second data pseudo-streams;
a merger configured to merge said first and said at least one second data pseudo-streams in order to reconstruct the data stream that includes the sequence of data packets,
wherein, in order to reconstruct said packet stream, said merger is configured to:
re-align said packet pseudo-streams on a basis of a value of a field of said data packet;
select, for each data packet of said re-aligned pseudo-streams, the one that contains a non-null packet; and
insert said non-null packet into the reconstructed data stream.

20. The receiver according to claim 19, wherein, if at a certain time instant all said data packets of said pseudo-streams are null packets, then said merger is configured to insert a null packet into the reconstructed data stream.

* * * * *